(12) United States Patent
Clerx

(10) Patent No.: US 6,733,398 B1
(45) Date of Patent: May 11, 2004

(54) AMUSEMENT DEVICE

(75) Inventor: Petrus Joseph Hubertus Clerx, Roermond (NL)

(73) Assignee: Vekoma Technology B.V., Vlodrop (NL)

( * ) Notice: Subject to any disclaimer, the term of this patent is extended or adjusted under 35 U.S.C. 154(b) by 0 days.

(21) Appl. No.: 10/221,688

(22) PCT Filed: Feb. 9, 2001

(86) PCT No.: PCT/NL01/00106

§ 371 (c)(1),
(2), (4) Date: Jan. 22, 2003

(87) PCT Pub. No.: WO01/68209

PCT Pub. Date: Sep. 20, 2001

(30) Foreign Application Priority Data

Mar. 16, 2000 (NL) .............................................. 1014660

(51) Int. Cl.⁷ .............................................. A63G 31/00
(52) U.S. Cl. ........................... 472/133; 472/49; 472/50; 297/465; 2/462
(58) Field of Search .............................. 472/49, 50, 59, 472/60, 61, 130, 133; 297/465, 484, 475; 104/53, 69, 83; 2/459, 460, 461, 463

(56) References Cited

U.S. PATENT DOCUMENTS

| | | | |
|---|---|---|---|
| 3,499,681 A | * 3/1970 | Benitez, Jr. et al. | 297/465 |
| 3,827,716 A | * 8/1974 | Vaughn et al. | 280/730.1 |
| 4,335,658 A | 6/1982 | VanderKelen | 104/69 |
| 5,306,044 A | * 4/1994 | Tucker | 280/801.1 |
| 5,665,002 A | * 9/1997 | Balwanz | 472/118 |
| 5,873,635 A | * 2/1999 | Merrick | 297/484 |
| 6,139,111 A | * 10/2000 | Pywell et al. | 297/484 |
| 6,309,024 B1 | * 10/2001 | Busch | 297/484 |
| 6,367,882 B1 | * 4/2002 | Van Druff et al. | 297/484 |
| 6,457,774 B2 | * 10/2002 | Baloga | 297/250.1 |

FOREIGN PATENT DOCUMENTS

| | | |
|---|---|---|
| GB | 1150085 | 4/1969 |
| WO | WO 99/22830 | 5/1999 |
| WO | WO 00/35723 | 6/2000 |

* cited by examiner

Primary Examiner—Kien T. Nguyen

(57) ABSTRACT

An amusement device comprising at least one holder for a person and a securing device for detachably securing a person in the holder. The holder comprises at least a seat and a backrest. The securing device includes at least two straps, first ends of which are positioned near a part of the backrest remote from the seat and second ends of which are positioned near the seat. The straps are each fitted with a lock plate between said first and said second ends, which lock plates can be detachably locked together. The straps furthermore each include at least one spring element, wherein the straps can be moved towards the holder against spring force.

8 Claims, 4 Drawing Sheets

AMUSEMENT DEVICE

DESCRIPTION

The invention relates to an amusement device comprising at least one holder for a person and a securing device for detachably securing a person in said holder, which holder comprises at least a seat and a backrest.

With amusement devices of this kind, as disclosed in WO 99/22830, a person is firmly fixed in position in the holder, after which the holder is moved over an elongated track. The securing device thereby prevents the person from leaving the holder undesirably.

The securing device must meet various requirements. Thus, the person must be able to seat himself in the holder and subsequently fit the securing device relatively quickly. The same holds with regard to the detaching of the securing device and the person leaving the holder. The time needed for entering and leaving the holder and for securing a person must be kept as short as possible, in order to ensure an optimum use of the amusement device.

Furthermore, the securing device must feel comfortable.

A few securing devices disclosed in WO 99/22830 comprise a rigid bar. Although it is possible to secure a person firmly in the holder by means of said rigid bars, they do not feel comfortable. In addition, there is a risk of the person's head bumping against said bars when the holder is being moved.

Other embodiments of the securing devices disclosed in WO 99/22830 comprise straps, which are laid over a person's shoulder and which are subsequently connected to movable rigid bars.

Although the straps of the securing devices disclosed in WO 99/22830 abut relatively comfortably against the person, said securing devices are relatively complicated.

The object of the invention is to provide an amusement device by means of which a person can be secured in a holder in a relatively quick and comfortable manner.

This objective is accomplished with the amusement device according to the invention in that the securing device includes at least two straps, first ends of which are positioned near a part of the backrest remote from the seat and second ends of which are positioned near the seat, which straps are each fitted with a lock plate between said first and said second ends, which lock plates can be detachably locked together, which straps furthermore each include at least one spring element, wherein the straps can be moved towards the holder against spring force.

The spring elements keep the straps apart and away from the holder. Since the straps are kept away from the holder, the seat and the backrest of the holder are freely accessible to a person who wishes to seat himself in the holder. The person can simply sit down on a seat and put his arms through the space that is present between the straps and the holder. Then the person can lock the lock plates together, after which the person is firmly retained in the holder. The straps can be made of any desired, preferably relatively soft material, so that they will abut comfortably against the person. When the lock plates are unlocked, the straps will be moved apart again under the influence of the spring force of the spring elements, thus enabling the person to leave the holder in a simple and efficient manner.

One embodiment of the amusement device according to the invention is characterized in that each strap includes a tensionable belt extending between said lock plate and said second end.

The tensionable belts enable easy adjustment of the straps to the length and the size of the person seating himself in the holder. The belts can be pulled out to a desired length upon boarding. Once the person is seated in the holder, having locked the lock plates together, the belts can be tensioned, for example until a predetermined pulling force is exerted on the belts. Alternatively, an amusement device attendant can press the lock plates against said person's body, whereby the belts are tensioned.

Another embodiment of the amusement device according to the invention is characterized in that each first end is rigidly connected to the part of the backrest remote from the seat.

Since said first ends are rigidly connected to the holder, the securing device is of relatively simple construction.

Yet another embodiment of the amusement device according to the invention is characterized in that the spring element comprises plastic fibres, which extend parallel to each other between the part of the backrest remote from the seat and the lock plate.

The use of said plastic fibres, for example glass fibres, makes it possible to use a relatively thin strap, which enhances the comfort of the strap. In addition, said plastic fibres are relatively flexible, so that the belt can easily adapt to the shape of the person seated in the holder.

The invention will now be explained in more detail with reference to the drawings, wherein.

Parts corresponding to each other are indicated by the same numerals in the figures.

Figure 1:
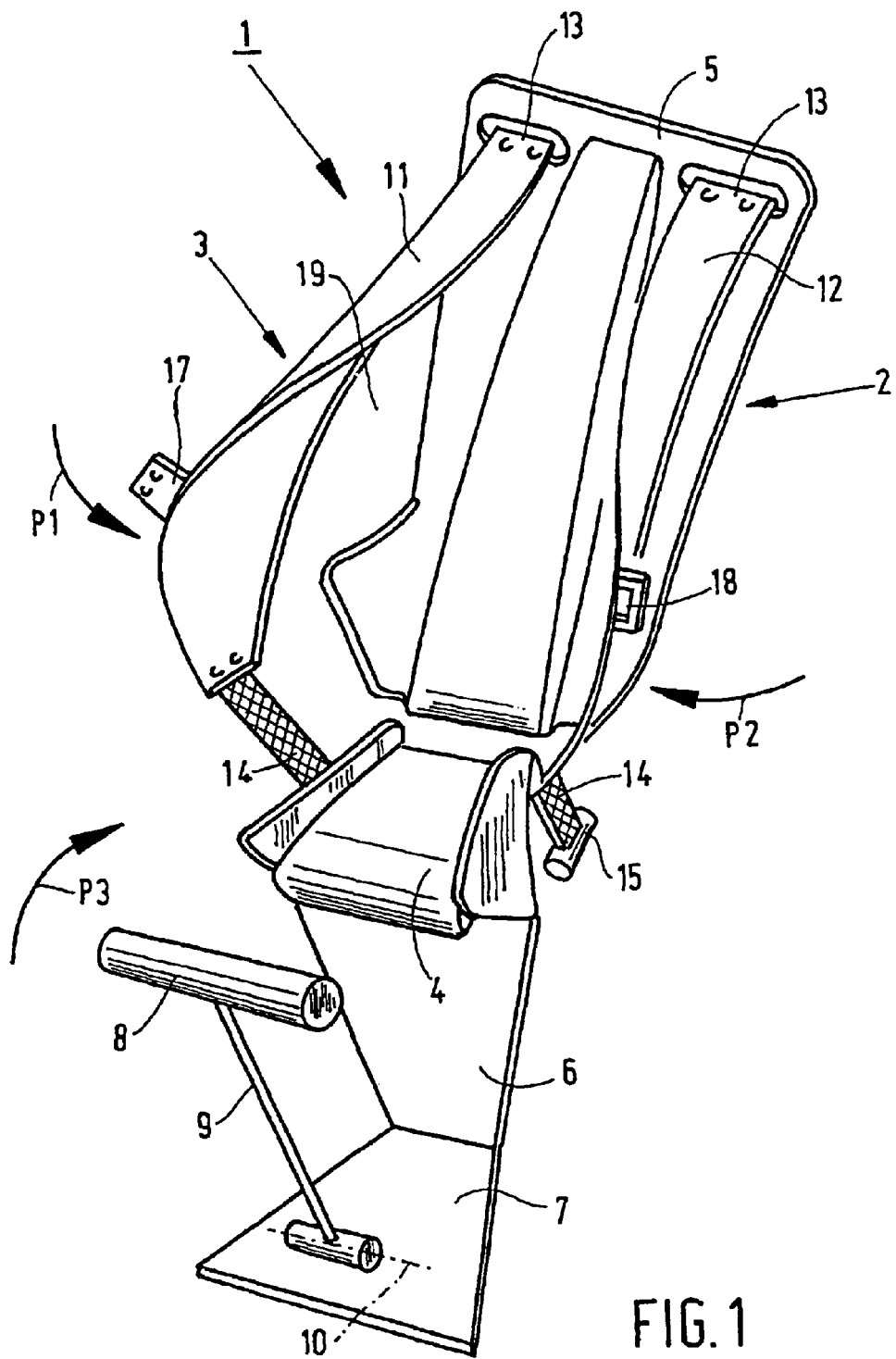
FIG. 1 is a perspective view of an amusement device according to the invention, which shows the boarding position.

FIG. 1 shows an amusement device 1 according to the invention, which comprises a holder 2 and a securing device 3. Holder 2 comprises a seat 4 and a backrest 5 attached thereto. Seat 4 is supported by a frame 6, which is fitted with a footrest 7 on a side remote from backrest 5. Holder 2 furthermore comprises a hip bar 8, which is connected to foot platform 7 by means of rod 9 while being pivotable about an axis 10.

Securing device 3 includes two straps 11, 12, which are each connected, with a first end 13 thereof, to a part of the backrest 5 remote from seat 4. Near seat 4, straps 11, 12 are connected to belt tensioning devices 15 with second ends 14 remote from said first ends 13. Belts 11, 12 are fitted with lock plates 16 at a position between said first and said second ends 13, 14 (see FIG. 4), to which a first part 17 and a second part 18, respectively, of a lock are attached.

Figure 4:
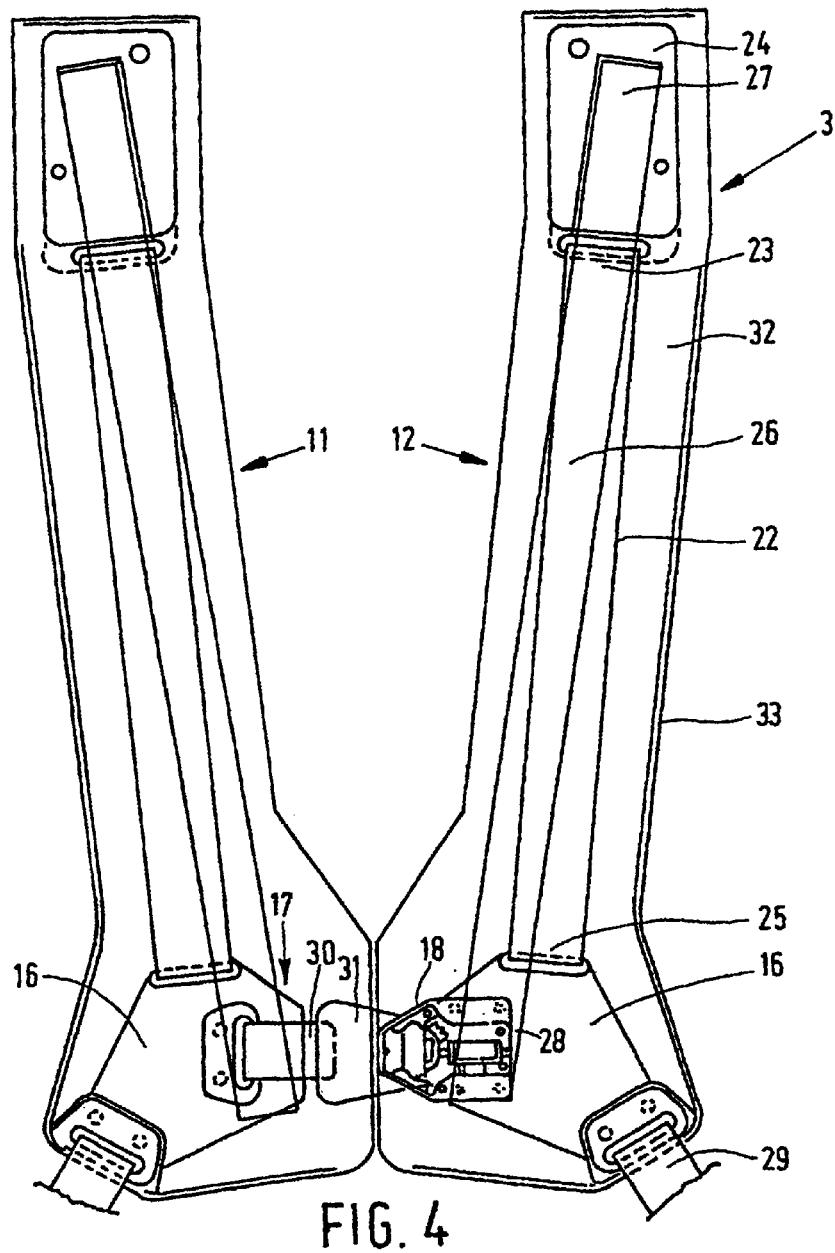
FIG. 4 is a front view of the securing device of the amusement device of FIGS. 1–3.

As will be explained in more detail with reference to FIGS. 4 and 5, straps 11, 12 have spring elements incorporated therein, which keep straps 11, 12 detached from backrest 5 and from the seat 4 as shown in FIG. 1. Openings 19 are thus formed between backrest 5, seat 4 and straps 11, 12, through which openings a person can put his arms upon seating himself in the holder.

Figure 2:
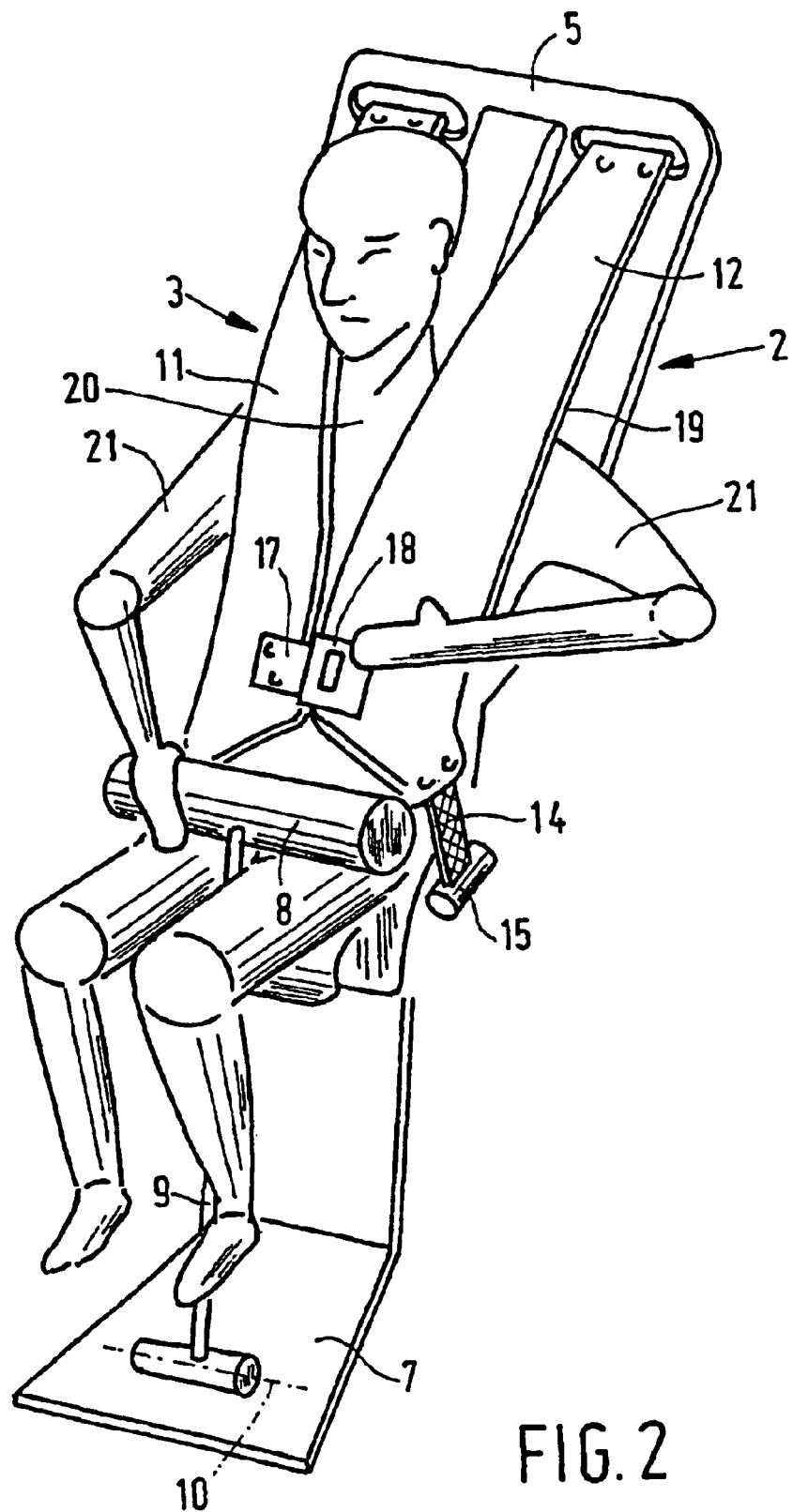
FIG. 2 shows the amusement device of FIG. 1 in the retaining position.

Following that, the person can move parts 17 and 18 of the lock towards each other, against the spring force of said spring elements, in the direction indicated by arrows P1, P2. Then the person can effect an interlocking engagement between the parts 17 and 18. The person will furthermore pull hip bar 8 with his hands towards his body, as a result of which hip bar 8 is tilted about axis 10 in the direction indicated by arrow P3. After the person has performed these operations, person 20 will be retained in holder 2 in the manner that is shown in FIG. 2. The arms 21 of person 20 thereby extend through openings 19.

Before the further operation of the securing device 3 is explained in more detail, the construction of securing device 3 will first be described with reference to FIGS. 4 and 5.

Each strap 11, 12 of the securing device comprises a first belt 22, which is firmly connected with a first end 23 to a metal plate 24 which is attached to the backrest 5. The second end 25 remote from first end 23 of the first belt 22 is connected to the lock plate 16. A strap 26 formed of glass fibres extends between said metal plate 24 and lock plate 16. Said strap 26 is connected to plate 24 with a first end 27 and to lock plate 16 with an end 28. The glass fibres are formed in such a manner that strap 11, 12 preferably takes up the position that is shown in FIG. 1.

Furthermore connected to lock plate 16 is a second belt 29, which is connected to belt tensioning device 15 on a side remote from lock plate 16.

Lock plate 16 of strap 12 includes the part 18 of the lock. A slot (not shown) is formed in said part 18.

Lock plate 16 of strap 11 includes the part 17 of the lock. Part 17 comprises a belt piece 30 connected to lock plate 16, and a metal plate 31 connected therewith. Plate 31 can be inserted into the slot that is present in part 18 and be locked in position in said part 18.

Figure 3:
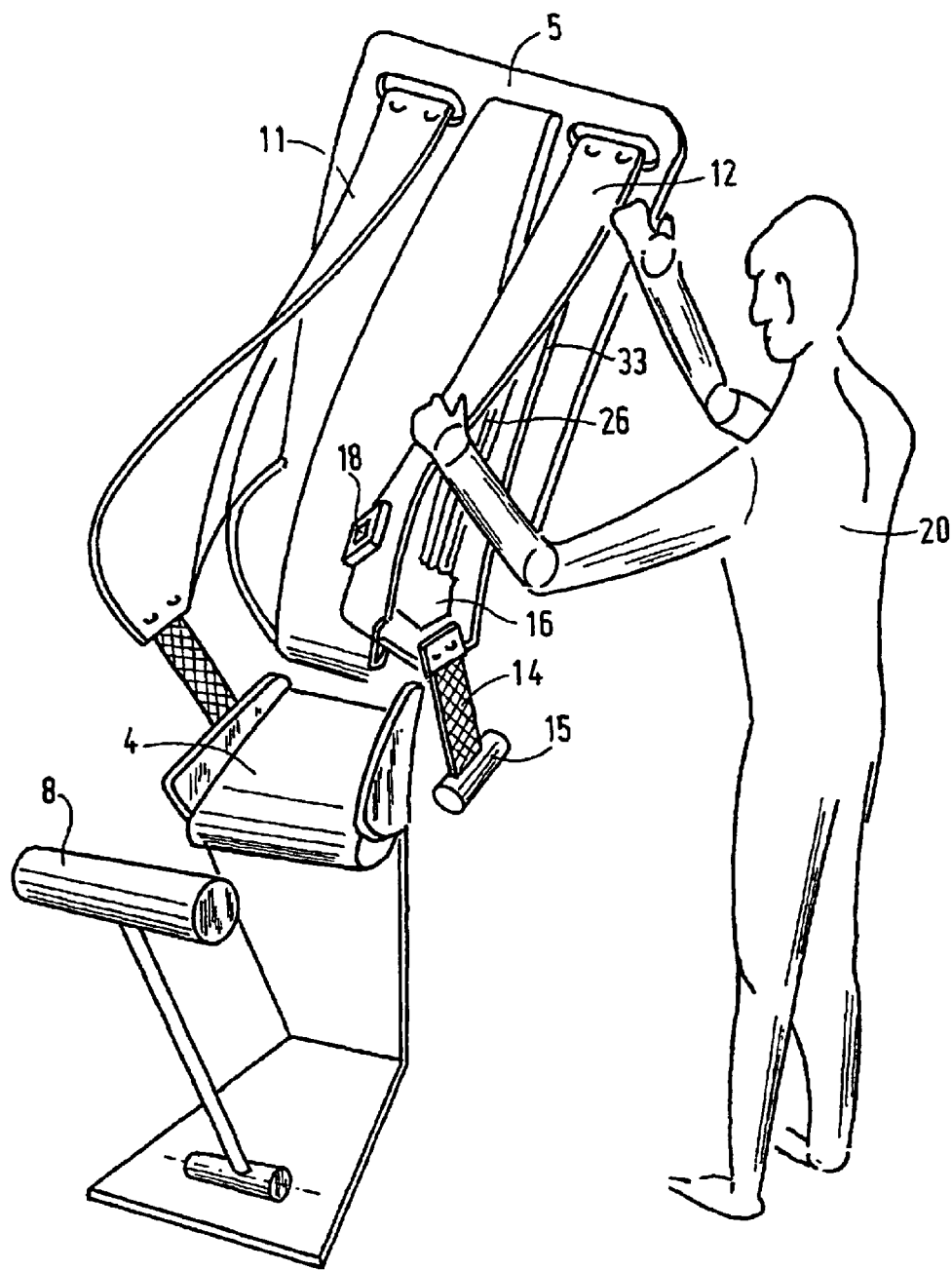
FIG. 3 shows the amusement device of FIG. 1 in the position during inspection.

Strap 11, 12 furthermore includes a cover 32, which encloses first belt 22, glass fibre strap 26 and lock plate 16. Cover 32 includes a closure 33 extending along the entire length of cover 32, which closure consists of velcro or a zipper, for example. Cover 32 is preferably made of a soft material in order to make the straps 11, 12 feel more comfortable. Furthermore, cover 32 hides the glass fibre strap 26 and the belt 22 from view, so that said parts are not directly accessible for sabotage. When closure 33 is opened, however, belt 22 and glass fibre strap 26 become accessible for inspection (see FIG. 3).

Figure 5:
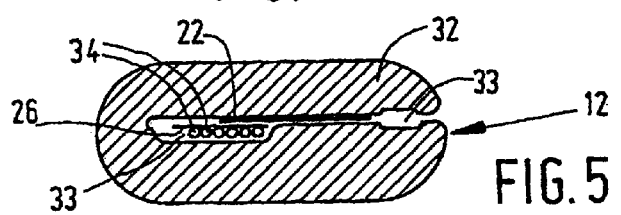
FIG. 5 is a cross-sectional view of the securing device of FIG. 4.

FIG. 5 is a cross-sectional view of strap 12, which clearly shows the belt 22 enclosed by cover 32 and the strap 26 formed of plastic fibres 34.

The lock, which comprises parts 17, 18, is preferably fitted with an electrically operated locking mechanism. The wiring of said locking mechanism can be passed through the space 35 in cover 32, for example. The lock preferably operates in such a manner that once plate 31 has been inserted into part 18, the lock cannot be opened by the person any more. At that moment the lock delivers a signal to indicate that the lock is locked. The holders cannot be moved over the, for example, elongate track of the amusement device until all the locks of the amusement device are locked. When the persons are to leave the amusement device, the amusement device attendant will operate a button, as a result of which an electric signal will be delivered to each lock, and the lock will be opened either automatically or after further manual operation by the person 20 present in holder 2.

If the closure 33 is a zipper, it is possible to have the zipper continue as far as behind the backrest 5, so that the zipper cannot be opened by a person present in the holder, in which case only an authorized person can operate the zipper upon inspection.

It is also possible to provide a leaf spring between plate 24 and lock plate 16 rather than the glass fibre strap 26.

What is claimed is:

1. An amusement device comprising at least one holder for a person and a securing device for detachably securing a person in said holder, which holder comprises at least a seat and a backrest, characterized in that the securing device includes at least two straps, first ends of which are positioned near a part of the backrest remote from the seat and second ends of which are positioned near the seat, which straps are each fitted with a lock plate between said first and said second ends, which lock plates can be detachably locked together, which straps furthermore each include at least one spring element, wherein the straps can be moved towards the holder against spring force.

2. An amusement device according to claim 1, characterized in that each strap includes a tensionable belt extending between said lock plate and said second end.

3. An amusement device according to claim 1 or 2, characterized in that each first end is rigidly connected to the part of the backrest remote from the seat.

4. An amusement device according to any one of the preceding claims, characterized in that the spring element comprises plastic fibres, which extend parallel to each other between the part of the backrest remote from the seat and the lock plate.

5. An amusement device according to any one of the preceding claims, characterized in that said spring element is a leaf spring.

6. An amusement device according to any one of the preceding claims, characterized in that each strap includes a belt extending between said first end and said lock plate.

7. An amusement device according to any one of the preceding claims, characterized in that each strap includes a cover extending between said first end and said lock plate, which cover encloses at least said spring element.

8. An amusement device according to claim 7, characterized in that said cover includes a closure that can be opened.

* * * * *